US007290707B2

(12) United States Patent
Sawasaki

(10) Patent No.: US 7,290,707 B2
(45) Date of Patent: Nov. 6, 2007

(54) TELE-INVENTORY SYSTEM, AND IN-SHOP TERMINAL AND REMOTE MANAGEMENT APPARATUS FOR THE SYSTEM

(75) Inventor: Naoyuki Sawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 588 days.

(21) Appl. No.: 09/982,925

(22) Filed: Oct. 22, 2001

(65) Prior Publication Data
US 2002/0143672 A1 Oct. 3, 2002

(30) Foreign Application Priority Data
Mar. 29, 2001 (JP) ............................. 2001-095466

(51) Int. Cl.
*G06Q 90/00* (2006.01)
(52) U.S. Cl. ...................... 235/385; 382/141; 705/28
(58) Field of Classification Search ................ 382/141, 382/152, 153; 414/273, 274; 700/245; 901/31, 901/36–38; 235/382.5, 383, 385; 705/28
See application file for complete search history.

(56) References Cited

U.S. PATENT DOCUMENTS

| | | | | |
|---|---|---|---|---|
| 3,669,288 A | * | 6/1972 | Young | 414/803 |
| 4,553,309 A | * | 11/1985 | Hess et al. | 29/450 |
| 5,025,477 A | * | 6/1991 | Baitz et al. | 382/100 |
| 5,142,658 A | * | 8/1992 | McMorran et al. | 382/104 |
| 5,497,314 A | * | 3/1996 | Novak | 705/17 |
| 5,780,826 A | * | 7/1998 | Hareyama et al. | 235/385 |
| 6,213,705 B1 | * | 4/2001 | Wilson | 414/274 |
| 6,480,759 B1 | * | 11/2002 | Ostwald et al. | 700/245 |
| 6,549,891 B1 | * | 4/2003 | Rauber et al. | 705/28 |

OTHER PUBLICATIONS

Hormozi et al., Manufacturing process improvement: The role of vision systems, Production and Inventory Management Journal. Alexandria: Fourth Quarter 1992, vol. 33, Iss. 4; p. 59, 5 pgs. (seven page printout).*

* cited by examiner

*Primary Examiner*—Andrew Joseph Rudy
(74) *Attorney, Agent, or Firm*—Staas & Halsey LLP

(57) ABSTRACT

A tele-inventory system for inventorying various kinds of commodities in a shop by an operator from a remote management apparatus installed remotely from the shop, includes, at shop, a camera for taking images of object commodities to be inventoried, a image-transmitter for transmitting the taken images of the object commodities to the remote management apparatus, and, at the remote management apparatus, an image-receiver for receiving the taken images of the object commodities from the image-transmitter and display for displaying the taken images of the object commodities, whereby the operator can make an inventory of the object commodities at the remote management apparatus with consulting the taken images of the object commodities which images have been displayed on the display. With this system, it is possible to inventory commodities sold and stocked in a department store or a convenience store from a remote place.

11 Claims, 7 Drawing Sheets

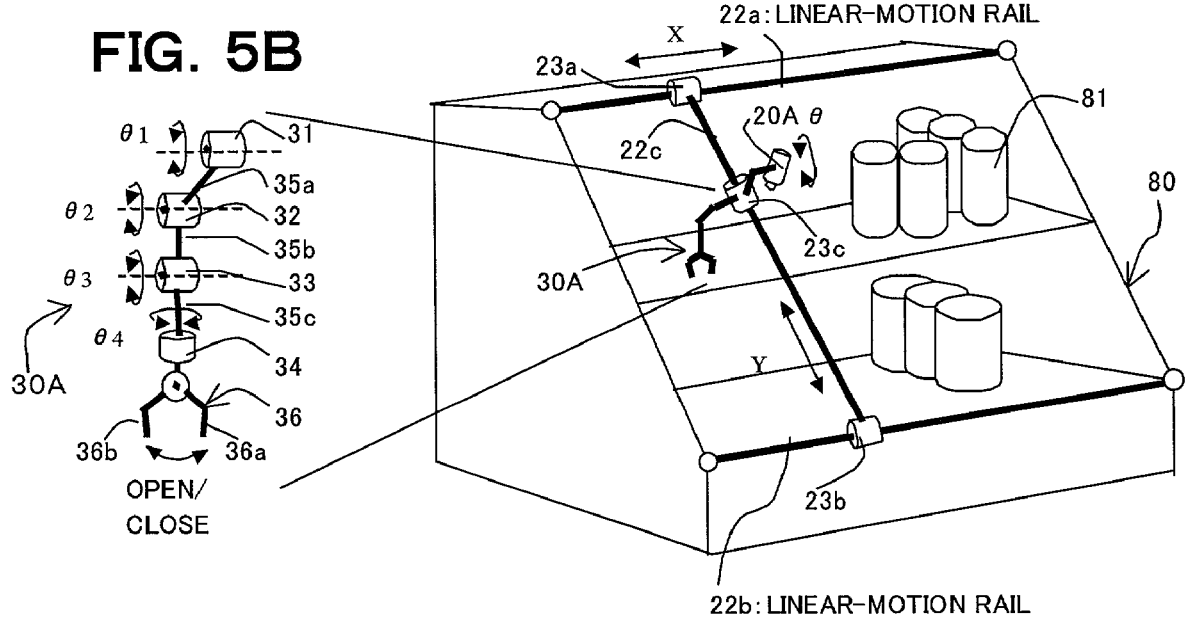

TELE-INVENTORY SYSTEM, AND IN-SHOP TERMINAL AND REMOTE MANAGEMENT APPARATUS FOR THE SYSTEM

BACKGROUND OF THE INVENTION

1. Field of the Invention

The present invention relates to a tele-inventorying system for inventorying various kinds of commodities in a shop, such as a department store and a convenience store, from a place remote from the shop, and also relates to an in-shop terminal and a remote management apparatus for the tele-inventory system.

2. Description of the Related Art

Generally, department stores or convenience stores periodically make an inventory of various kinds of commodities on sale throughout the shop premises in stock on shelves. During the inventorying, commodities of each kind are counted and the respective consume-by dates of commodities, such as food (especially perishable food), are checked.

A big retailing company, such as a franchising company, who controls a large number of chain retail stores, such as franchisee stores, in a centralized fashion regards the inventorying of various kinds of commodities on sale and/or in stock as important because the company has to estimate the potential sales figure for every kind of commodity as accurately as possible from the results of inventorying. Thanks to this inventorying, each large-scale retail store, with numerous selling areas, can grasp the details of sales for every selling area, streamlining the management of sales of many kinds of commodities throughout the whole store.

Many retail stores sell food, particularly fresh food, which has to be consumed within a limited date/time; food whose consume-by date/time has terminated or will terminate shortly must be removed from shelves without fail to eliminated the possibility of customers buying such out-of-date food. It is therefore important to check the consume-by date of each and every food commodity by making an inventory of all food commodities.

As the usual practice in, for example, a department store, inventorying is carried out by many sales clerks at the respective sales areas while the store is closed. In the meantime, sales clerks of a typical convenience store, which opens around-the-clock, make an inventory of commodities between serving customers.

However, in a department store, partly because inventorying is laborious and time-consuming due to the disarrayed commodities on shelves and partly because inventorying must be carried out at night when the store is closed or a relatively small number of customers visit the store, it is difficult to reserve sufficient manpower for the inventorying, causing a management problem. Another problem is that shorter-cycle inventorying, which franchisees or companies, for example, have started to require for their franchisee stores in recent years, is beginning to impose considerable burdens on store managers. Many employees and clerks of such chain stores consider the inventorying to be an unattractive job and hence tend to concentrate on serving customers while skipping inventorying, if possible.

SUMMARY OF THE INVENTION

With the foregoing problems in view, it is an object of the present invention to make an inventory of commodity, which are sold and stocked in a selling area of a shop, from a remote management apparatus that is installed remotely from the shop, lightening the burden imposed on operating retail business with the reduced number of clerks at the shop as making an inventory.

As the first generic feature, there is provided a tele-inventory system for inventorying various kinds of commodities in a shop by an operator from a remote management apparatus that is installed remotely from the shop, comprising: at the shop camera means for taking images of object commodities to be inventoried; image-transmitter means for transmitting the taken images of the object commodities to the remote management apparatus; at the remote management apparatus image-receiver means for receiving the taken images of the object commodities from the image-transmitter means; and display means for displaying the taken images of the object commodities which images have been received by the image-receiver means, whereby the operator is able to make an inventory of the object commodities at the remote management apparatus with consulting the taken images of the object commodities which images have been displayed on the display means.

As a preferable feature, the tele-inventory system may further comprise: at the remote management apparatus instruction-transmitter means for transmitting instructions of the operator to the shop; and at the shop instruction-receiver means for receiving the instructions of the operator from the remote management apparatus. As another preferable feature, the tele-inventory system may further comprise: at the shop camera control means for controlling the camera means based on the instructions of the operator, which have been received by the instruction-receiver means.

As a second generic feature, there is provided an in-shop terminal for use in a tele-inventory system in which various kinds of commodities in a shop are inventoried by an operator from a remote management apparatus that is installed remotely from the shop, there being installed at the shop camera means for taking images of object commodities in the shop, comprising: image-transmitter means for transmitting the images of object commodities, which images have been taken by the camera means at the shop, to the remote management apparatus; instruction-receiver means for receiving instructions of the operator from the remote management apparatus; and camera control means for controlling the camera means based on the instructions of the operator from the remote management apparatus which instructions have been received by the receiving means.

As a third generic feature, there is provided a remote management apparatus for use in a tele-inventory system in which various kinds of commodities in a shop are inventoried by an operator from the remote management apparatus, there being at the shop camera means for taking images of object commodities and image-transmitter means for transmitting the taken images of the object commodities to the remote management apparatus, comprising: image-receiver means for receiving the images of the object commodities, which images have been taken by the camera means of the shop, from the image-transmitter means of the shop; display means for displaying the taken images of the object commodities which images have been received by the image-receiver means; and instruction-transmitter means for transmitting instructions of the operator, which are for making an inventory of the object commodities in the shop, to the shop.

As mentioned above, it is possible for a tele-inventory system, and an in-shop terminal and a remote management apparatus for the system to guarantee the following advantageous results:

(1) Since an image of an object commodity which image has been taken in the shop is transferred to the remote management apparatus to be displayed the display means of the remote management apparatus, the operator that operates the remote management apparatus is able to make an inventory of the object commodities with reference to the images displayed on the display means, enabling the tele-invnetory performed at a remote place from the shop. For example, images of respective selling areas of a department store or images of respective shops located in remote places are transmitted to the head office or the like so that object commodities sold or stocked in the selling areas or in the shops are centralized inventoried from a remote place from the department store or the shops. As a result, the operator can inventory (specifically, count object commodities or check the expiration dates of object commodities) on demand (anytime as demand arises), reducing the cost of an inventory because of a reduced manpower for the inventory.

(2) The operator of the remote management apparatus can issue instructions to clerks disposed at the shop by transmitting the instructions to the shop from the remote management apparatus as required. Therefore it is possible to request the clerks in the shop to perform minimum operations that the operator is unable to perform from a remote place from the shop thereby surely making an inventory from the remote place.

(3) The operator of the remote management apparatus can issue instructions to the camera control means disposed at the shop by transmitting the instructions to the shop from the remote management apparatus as required in such a manner that the camera means takes an image of a desired object commodity. This allows the operator to remotely obtain various images from the shop, reducing mistakes in counting commodities. It is possible to guarantee a reliable inventory based on the images taken by the camera means.

(4) The operator of the remote management apparatus can control the manipulator control means by transmitting the instructions to the shop from the remote management apparatus as required in such a manner that the manipulator means manipulates a position and a posture of an object commodity. If the operator does not see an object commodity because of the object commodity being behind other commodities or other reasons, the operator can manipulate the other commodities by remotely controlling the manipulator means so as to see the object commodity on the display means. Further, if the operator do not see the expiration date of an object commodity which date is attached the package thereof on the display means, the operator can display the expiration date on the display means by remotely controlling the manipulator means so as to change the position of the object commodity. The remote control of the manipulator means allows to surely make an inventory based on the taken images without taking a time of clerks disposed at the shop.

(5) Since the shop previously stores a commodity information about a correlation between the individual object commodity and position information about a position of the individual object commodity in the database, it is possible for the operator, even if having no information about the layout of the shop, to obtain an image of the desired object commodity only by transmitting instructions designating the desired object commodity name to the camera control means of the shop, enabling an effective inventory with low costs.

(6) Since object commodities, such as expired commodities, labeled with the predetermined marks, it is possible for the operator to surely count the object commodities, with reference to images of the object commodities labeled with the predetermined marks. At that time, the operator counts the number of object commodities labeled with the predetermined marks (the number of times that the operator points the object commodities using the pointing means) thereby the number of object commodities are automatically counted with further accuracy.

(7) Since a particular commodity, such as an expired commodity, is labeled with the predetermined special mark, it is possible for an inventory employee to discriminate the particular commodity from commodities other than the particular commodity, with reference to images of the particular commodity and the other commodities, which images are displayed on the display means. The operator issues minimum and proper instructions (e.g., removing an expired commodity) to the clerk at the shop by transmitting the marked image (an image with attached additional information), in which an image of a particular commodity is labeled with the predetermined special mark, to the clerk from the remote management apparatus, realizing a further effective inventory system with reduced costs.

(8) The use of the security camera that is usually previously installed in the shop as a camera means realizes the tele-inventory system at a low cost.

(9) When the remote management terminal is a mobile information processing terminal, such as a mobile telephone, a company request a part-time-job employee to inventory the object commodities. Since the use of the mobile information processing terminal allows the company to reserve part-time-job employees that makes an inventory of the object commodities, it is possible to eliminate the need for employees of the company and clerks at the shops working as inventory employee, greatly reducing the cost for inventorying the object commodities.

(10) If the remote management terminal is located at a remote place in a different time zone of a shop place where the shop is located, it is possible to hire the employees or part-time-job employee, who live in the remote place, as inventory employees. This enables the employees or the part-time-job employee at the remote place to make inventory of the object commodities while the time zone in which the stores are located are in the nighttime hours, and it is possible to hire inventory employees in areas or countries require lower labor cost thereby realizing the tele-inventory system with a reduced cost.

(11) With the customer information terminal that is communicably connected to the in-shop terminal, it is possible for a customer to obtain and see an image of a target commodity only by transmitting a direction containing the name of the target commodity from the customer information terminal. As a result customers can confirm whether or not a target commodity is available at the shop in real time before going to the shop, thereby receiving supplementary services.

Other objects and further features of the present invention will be apparent from the following detailed description when read in conjunction with the accompanying drawings.

BRIEF DESCRIPTION OF THE DRAWINGS

FIG. 5A is a perspective view showing an overview of a manipulator section of the tele-inventory system of FIG. 1;

FIG. 5B is an enlarged perspective view showing the main part of the manipulator section of FIG. 5A;

DESCRIPTION OF THE PREFERRED EMBODIMENTS

A preferred embodiment of a present invention will now be described with reference to the accompanying drawings.

Figure 1:
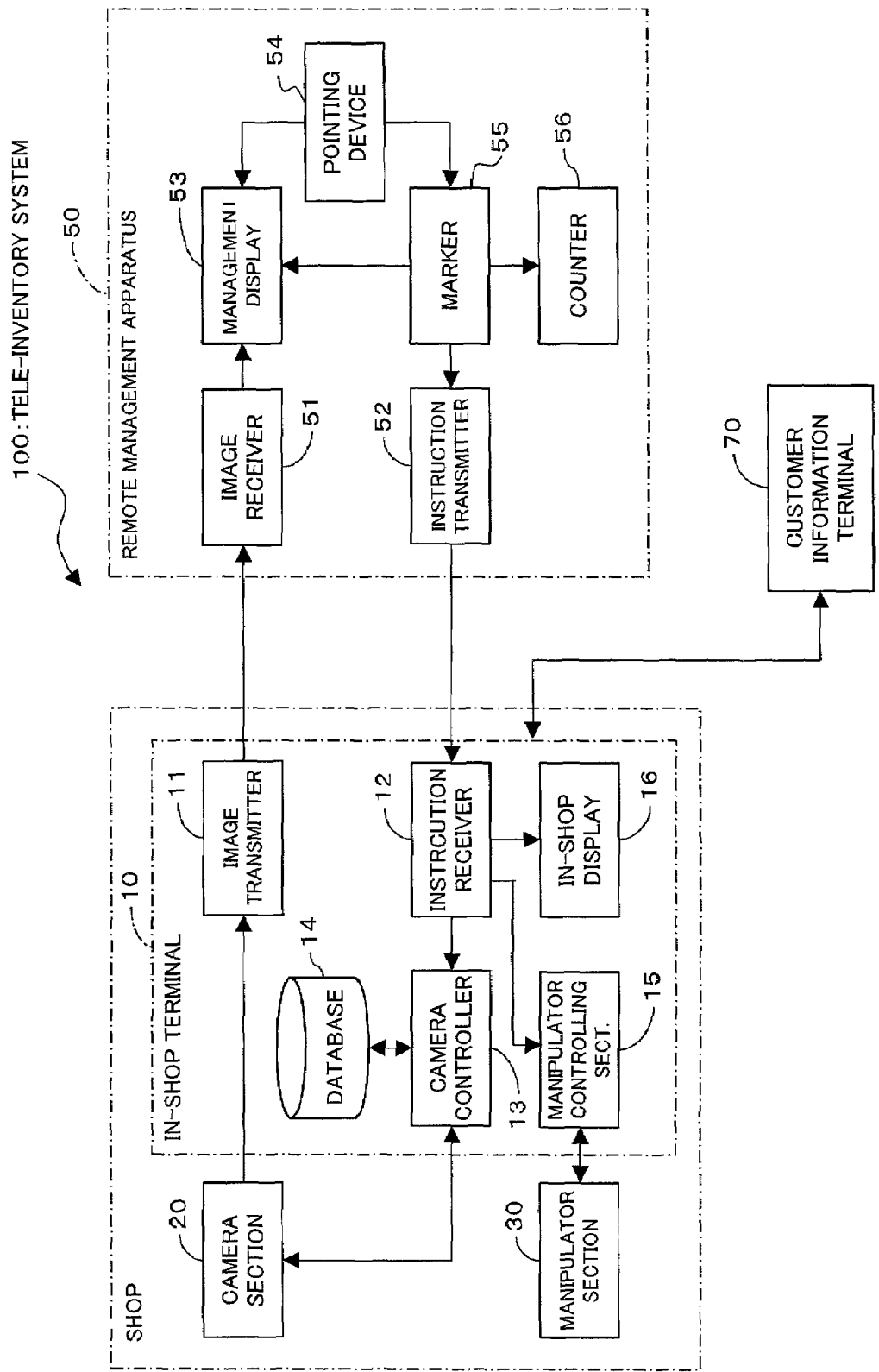
FIG. 1 is a block diagram schematically showing a tele-inventory system according to a first embodiment.

(A) First Embodiment:

(A-1) Fundamental Points of a Tele-Inventory System:

The fundamental points of a tele-inventory system according to a first embodiment of the present invention will now be described with reference to FIG. 1, which schematically shows the fundamental points of the tele-inventory system. As shown in FIG. 1, the tele-inventory system 100 comprises an in-shop terminal 10, a camera section 20, a manipulator section 30, and a remote management apparatus 50. The in-shop terminal 10, the camera section 20, and the manipulator section 30 are installed at a shop having one or more selling areas in which various kinds of commodities to be inventoried are sold and stocked. The remote management apparatus 50 is communicably connected to the in-shop terminal 10 and is installed remotely from the shop (at a remote area), and makes an inventory of the commodities in the shop.

The camera section 20 takes images of object commodities that are to be inventoried and that are in the shop, and the manipulator section 30 manipulates posture and position of individual object commodities.

The shop terminal 10 is a personal computer or the like, as described later, which serves to function as an image transmitter 11, an instruction receiver 12, a camera control section 13, a database 14, a manipulator controlling section 15 and an in-shop display 16.

The image transmitter 11 transmits images of the object commodities, which images have been taken by the camera section 20, to the remote management apparatus 50 and the instruction receiver 12 receives instructions from the remote management apparatus 50. These instructions are issued by an operator (hereinafter also called an inventory employee or an inventory operator) that operates the remote management apparatus 50, as described later.

The camera control section 13 controls the camera section 20 based on instructions received by the instruction receiver 12, and similarly, the manipulator controlling section 15 controls the manipulator section 30 based on instructions received by the instruction receiver 12.

The database 14 stores commodity information about a correlation between a name of an individual object commodity and position information about a position of the individual object commodity, previously. In the illustrated embodiment, if instructions to the camera control section 13, which instructions are received by the instruction receiver 12, designate a name of an object commodity, the camera control section 13 reads position information corresponding to the designated object commodity from the database 14, whereupon it controls the camera section 20 in such a manner that the camera section 20 takes an image of the designated object commodity based on the read position information.

The in-shop display 16 displays a later-described marked image, which the camera section 20 receives from the remote management apparatus 50.

The remote management apparatus 50 is also a personal computer as described later, and serves to function as an image receiver 51, an instruction transmitter 52, a management display 53, a pointing device 54, a marker 55, and a counter 56.

The image receiver 51 receives images taken of object commodities which images are taken by the camera section 20 at the shop, and the management display 53 displays the taken images, which have been received by the image receiver 51. The operator (the inventory employee, the inventory operator) that operates the remote management apparatus 50 makes arrangements for an inventory of the object commodities, while viewing the taken images of the object commodities, which images are displayed on the management display 53. The instruction transmitter 52 transmits the operator's instructions to the in-shop terminal 10 if the operator intends to instruct a clerk at the shop after seeing the taken images of the object commodities.

The pointing device 54, the marker 55, and the counter 56 serve to assist the operator at the remote management apparatus 50 in making arrangements for an inventory of the object commodities.

The pointing device 54 points to an individual object commodity in the taken images displayed on the management display 53.

The marker 55 labels an image taken of an individual object commodity, which image has been pointed to by the pointing device 54, with either one of a predetermined mark and a predetermined special mark other than the predetermined mark, which are selectively switched by a manner of operated the pointing device 54 are as the labeling. The predetermined special marks are allocated to particular object commodities, as described later. The predetermined marks are allocated to object commodities other than particular object commodities previously referred to.

The counter 56 counts the number of times that the pointing device 54 has been operated to automatically count the number of commodities to which the predetermined marks or the predetermined special marks have been allocated.

A marked image, in which one or more particular object commodities have been labeled with predetermined special marks by the marker 55, is returned to the shop by the instruction transmitter 52 together with instructions from the operator, in the illustrated embodiment. The marked image is received by the instruction receiver 12 in the shop, and displayed on the in-shop display 16 so that a shop clerk sees the marked image to make arrangements for various processes as instructed by the operator.

The camera section 20 may also serve as a security camera, which has usually been installed in the shop previously. The remote management apparatus 50 may be a mobile information terminal operated by the operator, and may be installed at a remote place in a different time zone from the time zone where the shop is located.

In the tele-inventory system 100 of the illustrated example, a plurality of customer information terminals 70, each operated by an individual customer of the shop, are communicably connected to the in-shop terminal 10 (the image transmitter 11 and the instruction receiver 12). When the instruction receiver 12 of the in-shop terminal 10 receives a direction containing the name of a target commodity from the customer information terminal 70, the camera control section 13 reads, from the database 14, commodity information with respect to the target commodity based on the direction, and controls the camera section 20 in such a manner that the camera section 20 takes an image of the target commodity. Then the image transmitter 11 transmits the image of the target commodity, which image has been taken by the camera section 20, to the customer information terminal 70.

(A-2) Practical Mode of the Tele-Inventory System:

A practical mode of the tele-inventory system 100 of FIG. 1 will now be described with reference to block diagram FIG. 2.

Figure 2:
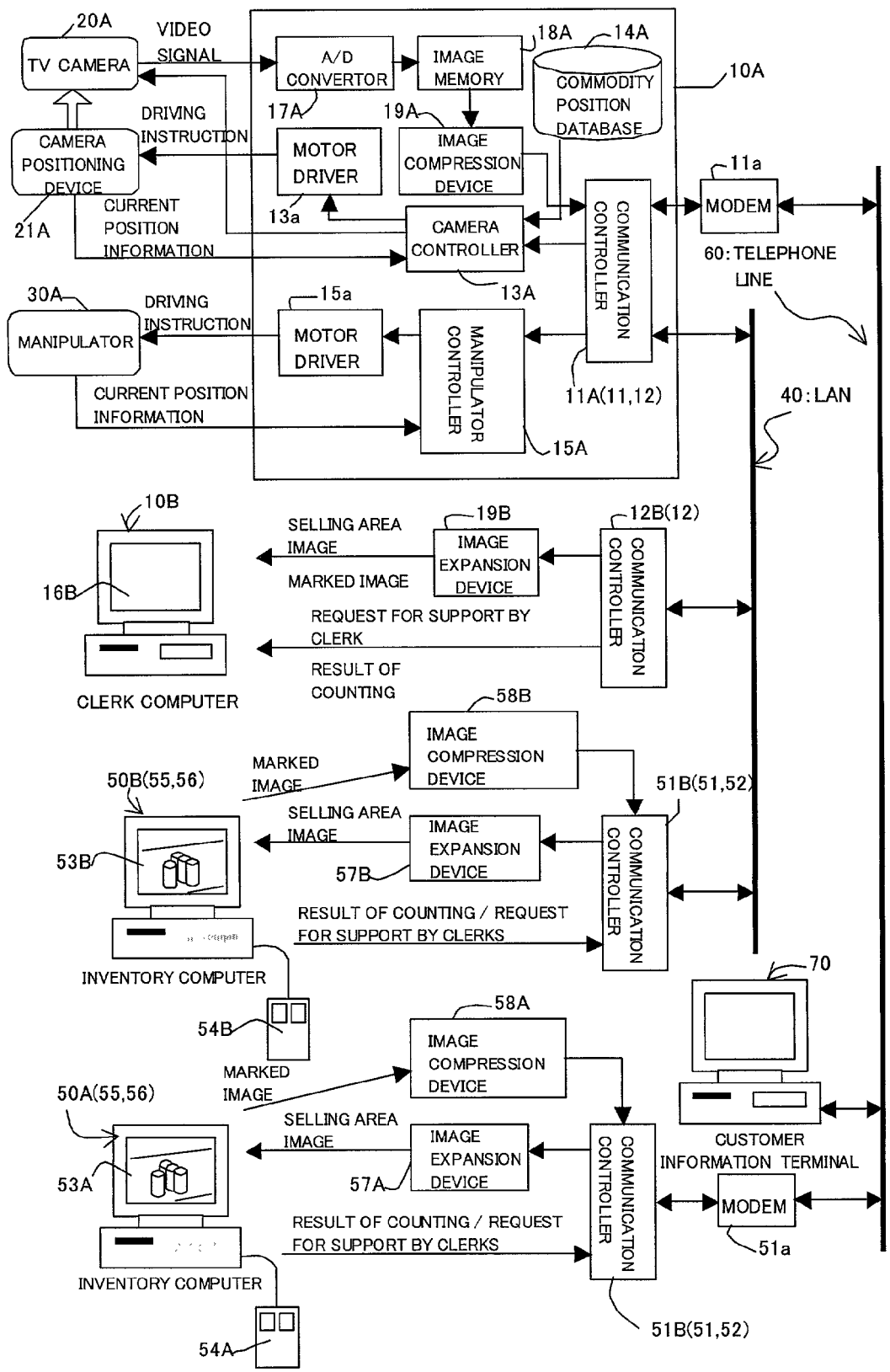
FIG. 2 is a block diagram schematically showing a practical mode of the tele-inventory system of FIG. 1.

In the tele-inventory system 100 of FIG. 2, the shop is equipped with a control computer 10A, a clerk computer 10B, a TV camera 20A, a camera positioning device 21A, and a manipulator 30A. The control computer 10A and the clerk computer 10B are connected to inventory computers 50A and 50B via a LAN (Local Area Network) 40 and/or a telephone line 60.

The control computer 10A, the TV camera 20A, the camera positioning device 21A, and the manipulator 30A are disposed at an individual selling area of a shop. The clerk computer 10B is disposed in the individual selling area, at a backoffice or at a common room of clerks, and is communicably connected to the control computer 10A via the LAN 40.

A combination of the control computer 10A and the clerk computer 10B serves to function as the above-mentioned in-shop terminal 10 (FIG. 1). In the illustrated embodiment, the control computer 10A and the clerk computer 10B are separate; however a computer, such as a personal computer, may serve to function as an overall control computer 10A and clerk computer 10B.

The TV camera 20A serves to function as the camera section 20 of FIG. 1, and is able to zoom in and out on an object of which an image is to be taken. The TV camera 20A is mounted to the camera positioning device 21A that controls the position and the posture of the TV camera 20A (the direction of image capture). A further description of the camera positioning device 21A will be made with reference to FIGS. 4A and 4B.

The manipulator 30a serves to function as the above-mentioned manipulator section 30 of FIG. 1 and its function will be described in more detail later with reference to FIGS. 5A and 5B.

The control computer 10A comprises a communication controller 11A, a camera controller 13A, motor drivers 13a and 15a, a commodity position database 14A, a manipulator controller 15A, an A/D (analog-to-digital) converter 17A, an image memory 18A and an image compression device 19A. The control computer 10A is a personal computer including an image-capture board, a motor-controlling board, and a LAN board. Execution of predetermined software by the personal computer realizes respective functions of the elements of the control computer 10A.

The communication controller 11A serves to function as at least the image transmitter 11 and the instruction receiver 12. The communication controller 11A transmits images of a selling area, which image is taken by the TV camera 20A, to the inventory computers 50A and 50B, and receives instructions from the inventory computers 50A and 50B.

The communication controller 11A is communicably connected to the inventory computer 50A and the respective customer information terminals 70 via a modem 11a and the telephone line 60, and is also communicably connected to the clerk computer 10B and the inventory computer 50B via the LAN 40. The modem 11a is interposed between the control computer 10A and the telephone line 60 in the illustrated example; however the control computer 10A may also serve to function as the modem 11a assuming an internal element.

The camera controller 13A and the motor driver 15a jointly serve to function as the above-mentioned camera control section 13. The camera controller 13A controls zoom-in/out operations of the TV camera 20A by issuing zoom-in/out instructions to the TV camera 20A based on instructions external from the control computer 10A. The camera controller 13A issues a driving instruction to a non-illustrated driving motor of the camera positioning device 21A via the motor driver 15a and obtains information about a current position of the TV camera 20A to feedback-control the position and the posture (the direction of image capture) of the TV camera 20A.

The commodity position database 14A corresponds to the above-mentioned database 14. The database previously stores commodity information about a correlation between an individual object commodity (e.g., the commodity name) and the position information about the position of the individual object commodity. The commodity position database 14A will be described in detail later with reference to FIG. 6.

The manipulator controller 15A and the motor driver 15a jointly serve to function as the manipulator controlling section 15 of FIG. 1. The manipulator controller 15A issues a driving instruction to a non-illustrated driving motor of the manipulator 30A via the motor driver 15a, and obtains information about a current position of the manipulator 30A to feedback-control operations of the manipulator 30A. This feedback control allows the manipulator 30A to manipulate (alter) the position and the posture of the object commodities.

The A/D converter 17A converts analog signals (image data) from the TV camera 20A to digital signals. The image memory 18A temporarily stores the digitalized image data, and the image compression device 19A that compresses the digitalized image data, which is stored in the image memory 18A, as the taken images of the object commodities (a selling area) are transmitted to the clerk computer 10B, the inventory computers 50A and 50B, and the like.

The control of the position and the posture (the direction of image capture) of the TV camera 20A in order to take an image of an individual object commodity, which control has been described with reference to FIG. 1, is realized by execution of predetermined software (program) by the control computer 10A, and is performed by the camera controller 13A. At that time, the camera controller 13A reads, from the commodity position database 14A, the positional information corresponding to an individual commodity contained in instructions issued from outside the control computer 10A, and controls the TV camera 20A based on the read position information, as described later with reference to FIG. 6.

The clerk computer 10B serves to function as a communication controller 12B, a display 16B, and an image expansion device 19B, and is a personal computer equipped with a LAN board or the like. Each element of the clerk computer 10B is realized by execution of predetermined software (programs) on the personal computer. The communication controller 12B and the image expansion device 19B, depicted as being external to the clerk computer 10B in FIG. 2, but are actually built in the clerk computer 10B. As an alternative, the clerk computer 10B may be a mobile information processing terminal, such as a mobile information terminal or a mobile telephone.

The communication controller 12B serves to function as at least the above-mentioned instruction receiver 12, and is communicably connected to the control computer 10A and the inventory computers 50A and 50B via the LAN 40 or the telephone line 60. The communication controller 12B receives an image of a selling area from the control computer 10A, and also receives instructions (e.g., a request for support by a clerk at a selling area), a marked image and a result of counting of object commodities from the inventory computers 50A and 50B.

The image expansion device 19B expands compressed images that have been received from the control computer 10A and the inventory computers 50A and 50B.

The display 16B serves to function as at least the above-mentioned in-shop display 16, and displays an image of a selling area which image has been received from the control computer 10A and instructions, a marked image and a result of counting of object commodities from the inventory computers 50A and 50B so that the clerks in a corresponding selling area see the information displayed thereon.

The inventory computers 50A and 50B respectively serve to function as the remote management apparatus 50 of FIG. 1. The inventory computer 50A includes a communication controller 51A, a management display 53A, a mouse 54A, an image expansion device 57A, and an image compression device 58A. Similarly, the inventory computer 50B includes a communication controller 51B, a management display 53B, a mouse 54B, an image expansion device 57B, and an image compression device 58B. In practice, the inventory computers 50A and 50B are personal computers, each having a LAN board or the like therein, and realize functions of respective elements by executing predetermined software (program). The communication controllers 51A and 51B, the image expansion devices 57A and 57B, and the image compression devices 58A and 58B appear external of the inventory computers 50A and 50B in FIG. 2, but are actually built in the inventory computers 50A and 50B.

The communication controllers 51A and 51B respectively serve to function as at least the image receiver 51 and the instruction transmitter 52 of FIG. 1. The communication controllers 51A and 51B receive instructions from the communication controller 12B, and transmit instructions from an inventory employee, a marked image, and a result of counting of object commodities to the control computer 10A or the clerk computer 10B.

The communication controller 51A is communicably connected to the control computer 10A and the clerk computer 10B via the modem 51a and the telephone line 60. The communication controller 51B is communicably connected to the control computer 10A and the clerk computer 10B via the LAN 40. The modem 51a may be built in the inventory computer 50A.

The image extension devices 57A and 57B respectively expand a compressed image (of a selling area) that has been received from control computer 10A, where an image data of the selling area has been compressed.

The management displays 53A and 53B respectively function as at least the management display 53 of FIG. 1, and display an image of a selling area, which image is received from the control computer 10A, so that an inventory employee (an operator, or an inventory operator) sees information thereon.

An inventory employee sees an image of a selling area displayed on the management display 53A or 53B, whereupon the employee operates the mouse 54A or 54B to count object commodities or to confirm the expiration date of an individual object commodity, as described later. Further, an inventory employee transmits various instructions to the inventory computers 50A and 50B, the control computer 10A and the clerk computer 10B, as required.

The mice 54A and 54B are operated by inventory employees, and respectively serve to function as the pointing device 54 of FIG. 1. An inventory employee clicks the mouse 54A or 54B on an image of an individual object commodity which image is displayed on the management display 53A or 53B to point to the image of the individual object commodity.

The inventory computers 50A and 50B respectively realize the supplemental functions performed by the marker 55 and the counter 56 by executing predetermined software (program).

At that time, the marker 55 labels the taken image of the individual object commodity, which image has been pointed to by the mouse 54A or 54B, with either one of a predetermined mark or a predetermined special mark as described with reference to FIG. 1. For example, with a cursor pointing to an image of an individual object commodity, a single click on the image labels the image of the individual object commodity with the predetermined mark, and a double click labels with the predetermined special mark. The predetermined marks, with which object commodities are labeled, help an inventory employee to accurately grasp the numbers of counted commodities the images of which are displayed when the inventory employee counts the commodity displayed on the management display 53A or 53B. The special marks, with which particular commodities are labeled, also help the inventory employee to accurately grasp the particular commodities on the management display 53A or 53B. The predetermined marks or the predetermined special marks will be described in detail later with reference to FIG. 7.

The counter 56 automatically counts the labeled object commodities by counting clicks (operations) of the mouse 54A or 54B.

A marked image, which is an image of an individual commodity which image is labeled with a predetermined special mark by the marker 55, is returned to the clerk computer 10B together with instructions (e.g., a request for support by a clerk at a selling area) of an inventory employee via the communication controller 51A or 51B. The image compression devices 58A and 58B respectively compress a marked image as the inventory computer 50A or 50B transmits the marked image to the clerk computer 10B.

The inventory computers 50A and 50B transmit instructions containing the name of an object commodity the image of which is to be taken, instructions to change a state of taking an image of an individual object commodity by the TV camera 20A, and instructions to move an individual object commodity by the manipulator 30A.

When an inventory employee wishes to display a desired object commodity on the management display 53A or 53B, the inventory employee transmits the name of the desired object commodity to the control computer 10A. Upon receipt of the name of the desired object commodity by the control computer 10A, the camera controller 13A causes the TV camera 20A to take an image of a selling area in which the desired object commodity is disposed, and the taken image of the selling area is transmitted to the inventory computer 50A or 50B and displayed on the management display 53A or 53B.

If the inventory employee wishes to change a state (such as zooming in/out or changing direction) of the TV camera 20A to take the image of a desired object commodity, which image is to be taken by the TV camera 20A and which image is displayed on the management display 53A or 53B, because of an obscured expiration date of the desired object commodity on the management display 53A or 53B or other reason, the inventory employee transmits instructions to change a state of taking the image to the control computer 10A. On the basis of the instructions, the camera controller 13A controls a zooming operation of the TV camera 20A and controls the position and the posture of the TV camera 20A via the camera positioning device 21A. The inventory computers 50A and 50B remotely control conditions of the TV camera 20A when taking an image.

Further if the inventory employee wishes to change the position of a desired object commodity, which image is taken by the TV camera 20A and displayed on the management display 53A or 53B, because of an obscured expiration date of the desired object commodity on the management display 53A or 53B or other reason, the inventory employee transmits instructions to change the position of the desired object commodity to the control computer 10A. On the basis of the instructions, the manipulator controller 15A controls the manipulator 30A in such a manner that the manipulator 30A changes the position or the posture of the desired object commodity. Namely, the inventory computers 50A and 50B remotely control the manipulator 30A.

On the other hand, the inventory computers 50A and 50B transmit instructions containing a request for support by a clerk at a selling area and instructions containing a result of counting of object commodities, to the clerk computer 10B. A request for support by a clerk at a selling area is issued by an inventory employee, who is at a remote place from the selling area, requests to a clerk at the selling area to carry out an operation that by an inventory employee (who is in a remote place) is unable to perform.

For example, if remote control of the manipulator 30A to change the position of the desired object commodity fails or the manipulator 30A is not installed in the shop, a request to change the position of the desired object commodity is issued. When the expiration date of the desired object commodity in the image displayed on the management display 53A or 53B is obscured, the inventory employee may request a clerk at the selling area to check the expiration date of the desired object commodity instead of requesting the clerk to change the position of the desired object commodity. If the inventory employee finds one or more expired object commodities by checking of expiration dates of the object commodities, the inventory employee requests a clerk at the selling area to remove (discard) the expired object commodities from the selling area. If it is difficult for the inventory employee to count the object commodities looking through the display 53A or 53B due to customers' movement of some of the object commodities, the inventory employee requests a clerk at the selling area to count the object commodities or to change the positions of the object commodities.

At that time, the inventory employee transmits a marked image, in which one or more expired object commodities that are to be removed are labeled with the predetermined special marks by the marker 55, to the clerk computer 10B together with a request for support by a clerk at the selling area. Upon confirming the marked image and the request for support by a clerk at the selling area on the display 16B, the clerk at the selling area performs proper operation (changing the position of the object commodity, checking the expiration date of the object commodity, removing the expired object commodities) in accordance with the request for support by a clerk at the selling area from the inventory employee.

The remote management apparatus 50 may be a mobile information terminal 50C, such as a mobile telephone, as an alternative to the inventory computers 50A and 50B.

Figure 3:
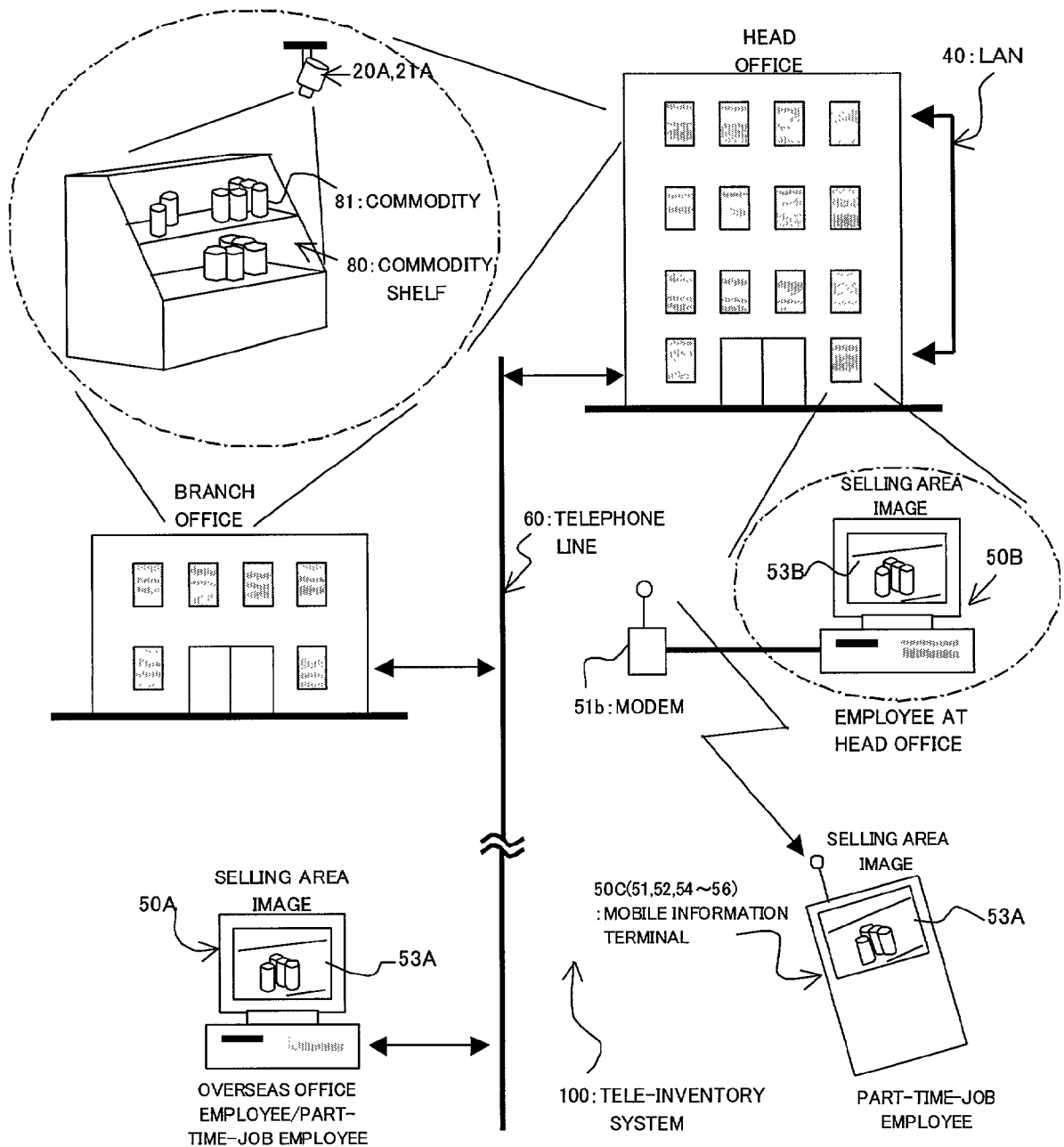
FIG. 3 is a diagram showing an arrangement of various elements of the tele-inventory system of FIG. 1.

(A-3) Arrangement of Various Elements of the Tele-Inventory System:

An arrangement of various elements of the tele-inventory system 100 of FIG. 2 will now be described with reference to FIG. 3. FIG. 3 shows an arrangement of various elements of the tele-inventory system 100. The TV camera 20A and the inventory computers 50A and 50B are arranged as shown in the example in FIG. 3. The same reference numbers in FIG. 3 as those described above with reference to FIGS. 1 and 2 designate identical elements or parts, so any repetitious description is omitted here.

A company owning a multiple of chain shops, such as convenience stores, installs the TV camera 20A, camera positioning device 21A, the control computer 10A (not shown in FIG. 3) and clerk computer 10B (not shown in FIG. 3) in the individual stores. Similarly, a department store having multiple selling floors installs the TV camera 20A, the camera positioning device 21A, the control computer 10A (not shown in FIG. 3) and the clerk computer 10B (not shown in FIG. 3) on every selling floor.

An image of an individual object commodity 81 disposed on a commodity shelf 80, which image is taken by the TV camera 20A, is transmitted to the inventory computer 50A or 50B or a later-described mobile information terminal 50C via the control computer 10A, the telephone line 60 and the LAN 40. The object commodities which images are taken by the TV camera 20A are concentratedly inventoried by the inventory computer 50A or 50B or the mobile information terminal 50C.

The inventory computer 50B is installed in the head office of the company, and is communicably connected to the control computers 10A, each disposed at each selling area of the head office, via the LAN 40. Further, the inventory computer 50B is communicably connected to each of the control computers 10A, each of which is disposed at each selling area of an individual branch office, via the telephone line 60.

The inventory computer 50B is communicably connected to a mobile information terminal 50C (a mobile information processing terminal, a remote management apparatus), such as a mobile telephone, operated by a part-time employee via modem 51b. The inventory computer 50B transmits images taken by the TV camera 20A to the mobile information terminal 50C, and receives various instructions and images from the mobile information terminal 50C. The mobile information terminal 50C is equipped with a management display 53C, and has identical functions as those of the inventory computers 50A and 50B. An operator is able to make a remote inventory of the object commodities using the mobile information terminal 50C.

The mobile information terminal 50C, of course, comprises the image receiver 51 and the instruction transmitter 52, likewise the inventory computers 50A and 50B. The mobile information terminal 50C may further comprise the pointing device 54, the marker 55, and the counter 56.

In this example, the inventory computer 50A is installed at a remote place, such as at an overseas branch office in a foreign country, in a different time zone from the time zone where the shop is located. Thereby, employees and part-time employees of the overseas branch office, as the inventory-taking employees, operate the inventory computer 50A to make a remote inventory of the object commodities.

An inventory employee obtains an image of a selling area where a desired object commodity is stocked using the inventory computer 50A or 50B or the mobile information terminal 50C as required, and sees the obtained image of the selling area which image has been displayed on the management display 53A, 53B, or 53C in order to count the object commodities obtained in the image and check the expiration dates of the individual object commodities. At that time, if the inventory employee has difficulty in counting the object commodities or checking the expiration date of an individual object commodity due to a customer's movement of the object commodity or other reason, the inventory employee notifies a clerk at the selling area of the difficulty and the clerk makes an inventory of only the obscured object commodities.

In the tele-inventory system 100, it is possible to make an inventory of object commodities at a place remote from a shop where the object commodities are sold and stocked. Images of the individual floor of a department store and images of the individual selling area of the individual shop located at a remote place from the head office are transmitted to the inventory computer 50B of the head office, in which the object commodities sold and stocked in multiple floors or shops at remote places are concentratedly inventoried. With such a centralized inventory system, it is possible to make arrangements to inventory the object commodities, such as counting or checking the expiration dates, on demand. This allows clerks at an individual selling area to be reduced, enabling inventorying costs to be cut.

An inventory employee transmits instructions for the shop to the shop (the clerk computer 10B) from the inventory computer 50A or 50B, or the mobile information terminal 50C so that the inventory employee notifies a clerk or the like at the shop of the transmitted instructions to make various arrangements for inventorying, as required. If the inventory employee is unsuccessful in performing operations with respect to an inventory of the object commodities referring only to images of the selling areas, the inventory employee requests a clerk at the selling areas to perform minimum operations, which the inventory employee cannot perform from a remote place, thereby surely making an inventory of the object commodity using the inventory computer 50A or 50B, or the mobile information terminal 50C.

The use of the telephone line 60 as a communication means allows a part-time employee to inventory the object commodities. For example, a company which intends to inventory object commodities requests the part-time employee to inventory (count) the object commodities over the telephone. After that, the part-time employee connects the inventory computer 50A, or a terminal (such as a mobile information telephone) which serves to function as the mobile information terminal 50C, to the control computer 10A installed at the shop via the telephone line 60 to obtain images of a selling area where the object commodities to be inventoried are placed. The part-time employee makes an inventory of the object commodities with reference to the obtained images of the selling area. Since part-time employees that can perform inventory taking are easily found and hired, it is possible to eliminate the need for employees of the company and clerks at the shops to work as inventory employees, thereby greatly reducing the cost of inventorying the object commodities.

If the company owns a multiple of chain shops located worldwide, the company installs the inventory computer 50A at a remote place in a different time zone where some of the shops are located and hires employees or part-time employee, who live in the remote place, as inventory employees. This enables the employees or the part-time employees at the remote place to inventory the object commodities while it is night in the time zone in which the stores are located, and it is day in the remote place where the inventory computer 50A is located. One advantage is that inventory taking performed during the daytime is less costly than inventorying performed during nighttime. A further advantage is that it is possible to hire inventory employees in areas or countries where labor costs are.

Figure 4A:
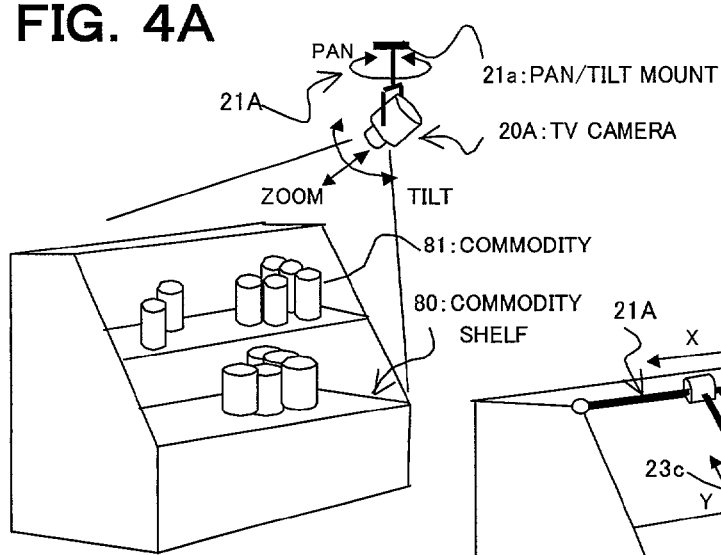
FIGS. 4A and 4B are perspective views respectively showing the camera section of the tele-inventory system of FIG. 1.
Figure 4B:
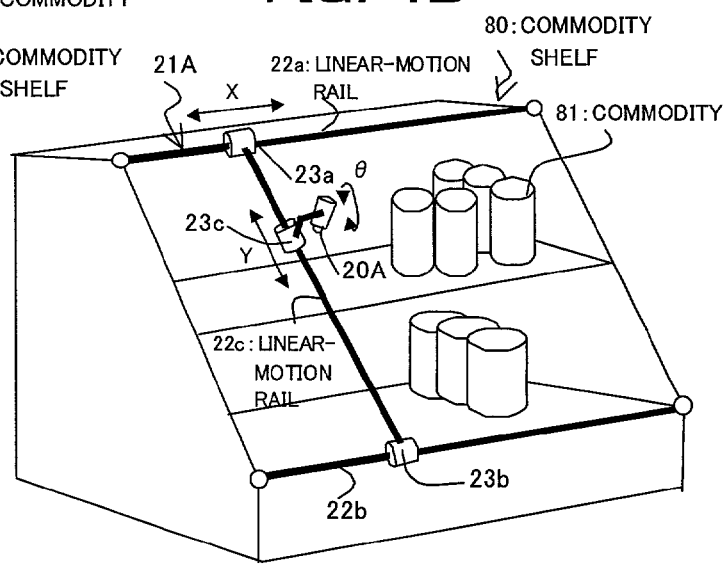

(A-4) Configuration of the Camera Section:

The TV camera 20A and the camera positioning device 21A, which are installed in a shop in the tele-inventory system 100, will now be described with reference to FIGS. 4A and 4B. FIGS. 4A and 4B are perspective views respectively showing a camera section of the tele-inventory system 100.

In FIG. 4A, the TV camera 20A capable of zooming in/out on an object of which an image is to be taken is mounted on a pan/tilt mount 21a of the camera positioning device 21A. The pan/tilt mount 21a is controlled by the camera controller 13A and the motor driver 15a in such a manner that the position and the posture of the TV camera 20A that takes an image of a selling area is remotely controlled.

The zoom-in/out operations of the TV camera 20A are directly controlled by the camera controller 13A, as mentioned above. A security camera previously installed in the shop may also serve as the TV camera 20A, which is used as shown in FIG. 4A. Conversely, the TV camera 20A that is installed for the tele-inventory system 100 may be also used as a security camera.

In the example of FIG. 4B, the camera positioning device 21A is composed of linear-motion rails (axial of screws) 22a, 22b, 22c and sliding (nut) members 23a, 23b, 23c, which elements are fixed to the commodity shelf 80.

The linear-motion rails 22a and 22b are fixed respectively along the top and bottom horizontal frames of the commodity shelf 80, and are fixed parallel to each other. The sliding members 23a and 23b are respectively screwed to the linear-motion rails 22a and 22b. The linear-motion rail 22c is attached to the sliding members 23a and 23b and is perpendicular to the linear-motion rails 22a and 22b. The sliding member 23c is screwed to the linear-motion rail 23c. The TV camera 20A is mounted on the sliding member 23c, and is angularly moved in the direction of the double arrow "θ" in FIG. 4B by a non-illustrated driving motor.

The linear-motion rails 22a, 22b, 22c are angularly moved by non-illustrated motors. The non-illustrated motors rotate the linear-motion rails 22a and 22b in synchronism with each other so that the sliding members 23a, 23b, and 23c, each serve to the respective linear-motion rail 22a, 22b or 22c, and the TV camera 20A all together move in the horizontal direction (in the direction of the double arrow "X"). Rotation of the linear motion rail 22c simultaneously moves the sliding member 23c and the TV camera 20A in the vertical direction (in the direction of the double arrow "Y") along the linear-motion rail 22c.

The camera controller 13A and the motor driver 15a control the non-illustrated motors that control rotation of the linear-motion rails the 22a, 22b, 22c and the TV camera 20A thereby remote control the position and the direction of the TV camera 20A in a state of taking as images of the object commodity.

As mentioned above, an inventory employee transmits necessary instructions to the shop (control computer 10A) from the inventory computer 50A or 50B, or the mobile information terminal 50C to remote control the state of TV camera 20A as taking an image of an object commodity and to remote operate the TV camera 20A to take an image of an object commodity, via the camera controller 13A, the motor driver 15a, and the camera positioning device 21A.

With this controlling of the TV camera 20A, it is possible for an inventory employee to obtain various images of the selling area using the inventory computers 50A and 50B, and the mobile information terminal 50C, thereby reducing mistakes in counting object commodities or the like. As a result, a reliable inventory can be guaranteed based on the images received from the shop.

If a security camera previously installed at the shop is used as the TV camera 20A, the tele-inventory system 100 can be constructed at a reasonable cost.

(A-5) Detailed Description of Manipulator Section:

The manipulator 30A that is installed in the shop in the tele-inventory system 100 will now be described in detail with reference to FIGS. 5A and 5B. FIG. 5A is a perspective view showing an overview of a manipulator section of the tele-inventory system of FIG. 1, and FIG. 5B is an enlarged perspective view showing the main part of the manipulator section of FIG. 5A. The same reference numbers in FIGS. 5A and 5B as those described above designate identical elements or parts, so any repetitious description is omitted here.

As shown in FIG. 5A, the manipulator 30A includes the camera positioning device 21A composed of the liner-motion rails 22a, 22b and 22c, and the sliding members 23a, 23b and 23c, which have been described with reference to FIG. 4B. The operating end of the manipulator 30A is further fixed to the sliding member 23c, to which the TV camera 20A is fixed.

The operating end of the manipulator 30A consists of joints 31, 32, 33 and 34, arms 35a, 35b and 35c, and a grasping mechanism 36. The joint 31 is fixed to the sliding member 23c, and angularly moves the arm 35a in the direction of the double arrow "$\theta_1$" by using a non-illustrated motor therein. The joint 32 is fixed to the end portion of the arm 35a and angularly moves the arm 35b in the direction of the double arrow "$\theta_2$" by using a non-illustrated motor therein. Similarly, the joint 33 is fixed to the end portion of the arm 35b and angularly moves the arm 35c in the direction of the double arrow "$\theta_3$" by using a non-illustrated motor therein; and the joint 34 is fixed to the end portion of the arm 35c and angularly moves the entire grasping mechanism 36 in the direction of the double arrow "$\theta_4$" by using a non-illustrated motor therein.

The grasping mechanism 36 comprises a pair of finger members 36a and 36b that are tongs that can cooperatively grasp commodities 81 arranged on the commodity shelf 80. The finger members 36a and 36b are driven by a non-illustrated driving motor in such a manner that the finger members 36a and 36b open and close.

Since the manipulator controller 15A and the driving motor 15a controls the non-illustrated motors equipped with the linear-motion rails 22a, 22b and 22c and the operating end of the manipulator 30A grasp and movement operations with respect to commodities 81, which operations are performed by the manipulator 30A (the grasping member 36), are remotely controlled.

Close positioning of the TV camera 20A and the manipulator 30A allows an inventory employee at a remote place from the shop to precisely operate the remote manipulator 30A because the inventory employee recognizes relative positioning between the object commodity and the operating end of the manipulator 30A (especially the grasping mechanism 36) with reference to images taken by the TV camera 20A.

In the illustrated embodiment, it is possible for an inventory employee to remotely manipulate the posture and the position of the commodity 81 using the manipulator controller 15A, the motor driver 15a and the manipulator 30A as required by transmitting instructions to the shop (the control computer 10A) from the inventory computer 50A or 50B, or the mobile information terminal 50C.

When an inventory employee cannot see an object commodity on the management display 53A, 53B or 53C of the inventory computer 50A or 50B, or the mobile information terminal 50C due to the object commodity being behind other commodities or for other reasons, the inventory employee remotely manipulates the manipulator 30A to move the other commodities in such a manner that the object commodity appears on the management display 53A, 53B, or 53C.

When an inventory employee cannot see the expiration date of an object commodity, which is marked on the package of the object commodity displayed on the management display 53A, 53B or 53C, the inventory employee remotely manipulates the manipulator 30A to change the posture of the object commodity in such a manner that the expiration date of the object commodity appears on the management display 53A, 53B, or 53C.

With the manipulator 30A, the manipulator controller 15A and the driving motor 15a, it is possible to surely make an inventory of the object commodities (especially, to manage the expiration dates of perishable foods) stocked at a shop based on the obtained images, thereby saving labor of the staff members (clerks) at the shop.

In general, the manipulator 30A needs four to five degrees of freedom; however some shapes and materials of commodities may be handled by a simpler manipulator with fewer degrees of freedom.

(A-6) Description of Commodity Position Database:

The commodity position database 14A in the tele-inventory system 100 (the control computer 10A) will be now described with reference to FIG. 6.

Figure 6:
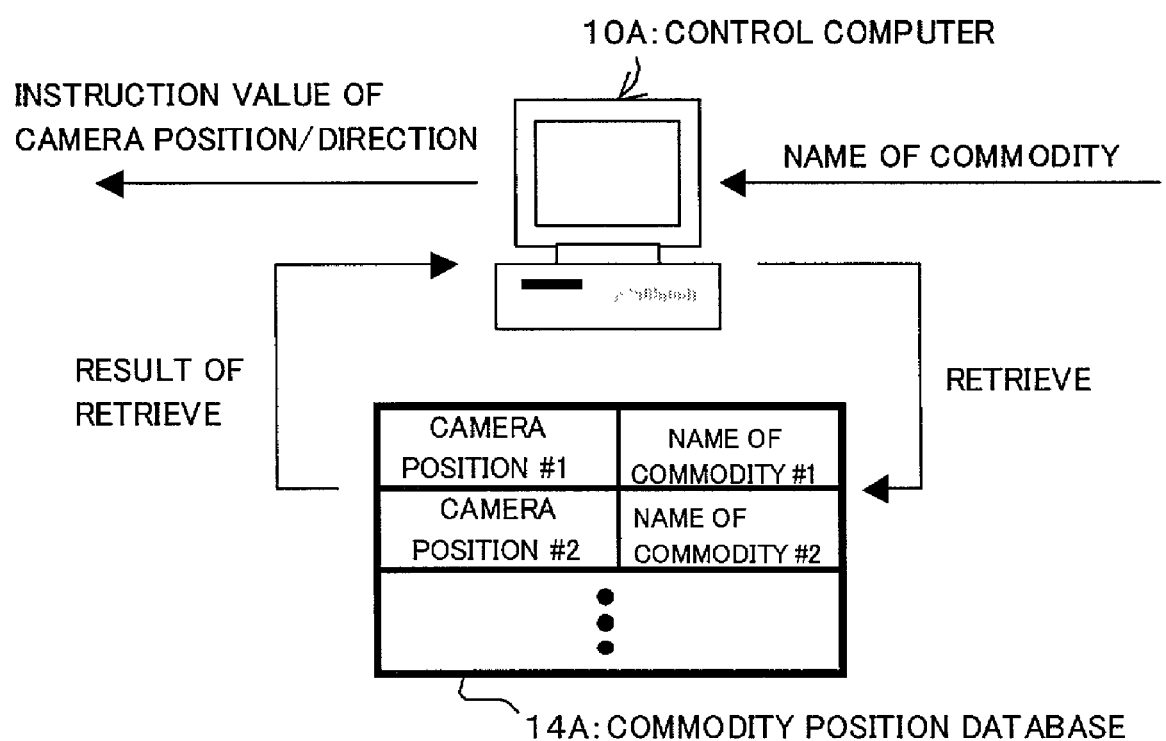
FIG. 6 is a diagram showing a commodity position database disposed in an in-shop terminal of the tele-inventory system of FIG. 1.

As shown in FIG. 6, the commodity position database 14A stores commodity information about a correlation between the individual object commodity (a commodity name) that is disposed at a selling area and a position of the TV camera 20A, which position is set for taking an image of the individual object commodity, previously.

Namely, the commodity position database 14A stores the position and the posture (the orientation) of the TV camera 20A as commodity position information. With the commodity position database 14A, when the TV camera 20A is arranged at the registered position in the registered posture and is prompted to take an image, TV camera 20A automatically takes an image of an individual object commodity being correlated with the position information in the commodity position database 14A. If a plurality of TV cameras 20A are installed in an individual selling area, the commodity position database 14A also stores information about which TV camera would be used to take an image of an individual object commodity, which information is registered by being correlated with a corresponding commodity name together with the position information.

In the shop of the tele-inventory system 100, since the commodity position database 14A stores a correlation between the name of an individual object commodity and positioning information about the position and the posture of the TV camera 20A (position information about a position of the individual object commodity), it is possible for an inventory employee, even if having no information about the layout of the selling area, to obtain an image of the desired selling area by only transmitting instructions designating an object commodity name to the control computer 10A (the camera controller 13A) from the inventory computer 50A or 50B, or the mobile information terminal 50C, enabling an effective inventory at low cost.

As shown in FIGS. 1 and 2, since the customer information terminals 70, each operated by a customer of the shop, are communicably connected to the control computer 10A of the shop via the telephone line 60 in the illustrated embodiment, an image of a selling area where a desired target commodity is sold is displayed on a non-illustrated display of the customer information terminal 70 by only sending the control computer 10A a direction containing the name of the desired target commodity to activate the commodity position database 14A and the camera controller 13A. As an advantageous result, customers can obtain and see the image, and can confirm whether or not a target commodity is available at the shop in real time before going to the shop, thereby receiving supplementary services.

(A-7) Description of a Function for Assisting in Operation of the Tele-Inventory System:

A function for assisting in operation of the tele-inventory system 100 (the inventory computers 50A and 50B, the mobile information terminal 50C) will be now described with reference to FIG. 7.

In the illustrated embodiment, an inventory employee, which operates the inventory computer 50A or 50B, uses the marker 55, the counter 56, the mouse 54A or 54B when making an inventory (such as counting object commodities, checking expiration dates).

Figure 7:
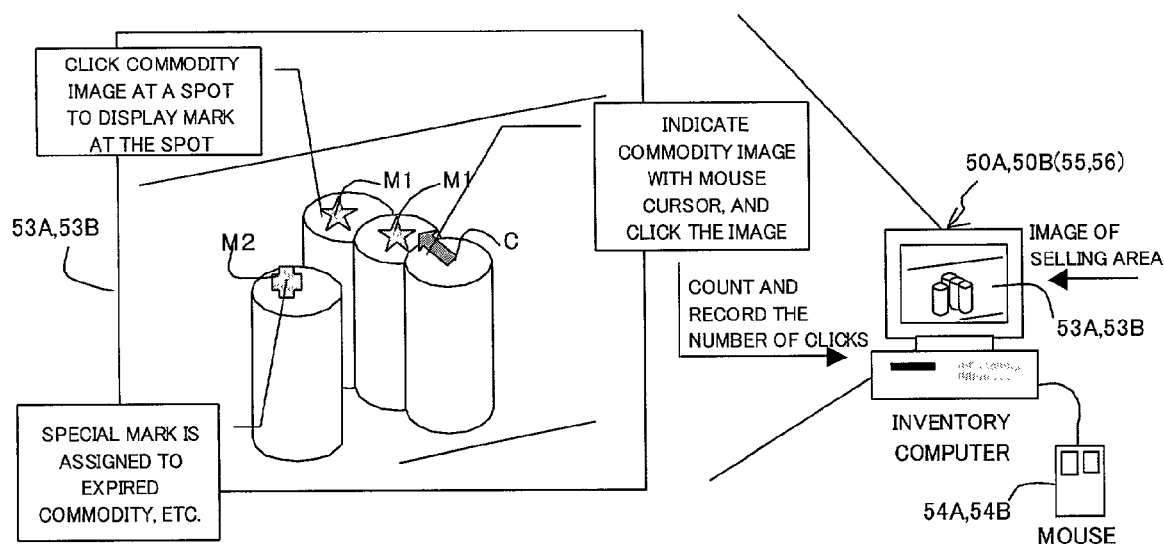
FIG. 7 is a diagram showing a function for assisting in operation performed in the tele-inventory system of FIG. 1.

As shown in FIG. 7, when an inventory employee indicates an image of an individual object commodity with a cursor and clicks the images with the mouse 54A or 54B one by one to count object commodities, the marker 55 labels the clicked image of the individual commodity (located at the position at which the mouse 54A or 54B has been clicked on the management display 53A or 53B) with a star-shaped predetermined mark M1. The inventory employee repeats this indication and clicks with respect to a plurality of images of object commodities to be inventoried so that the images of the plural object commodities are labeled with the predetermined mark M1. At that time, the counter 56 counts the clicks thereby automatically counting the clicked images of the object commodities. Further, labeling the clicked images of the object commodities with the predetermined marks M1 helps the inventory employee to clarify images of an object commodity that has been already counted, which images are displayed on the management display 53A or 53B.

If the inventory employee found an expired commodity in the images of the object commodities, which images are displayed on the management display 53A or 53B, the inventory employee indicates the image of the expired commodity by cursor and performs a predetermined operation (e.g., double-clicks) on the image with the mouse 54A or 54B to label the image of the expired commodity with a cross-shaped predetermined special mark M2 that is different from the predetermined mark M1. As a result, labeling the image of an expired commodity with the predetermined special mark M2 helps the inventory employee to clarify the expired commodity, which image is displayed on the management display 53A or 53B. The commodity of which the image is labeled with the predetermined special mark M2 should by no means be limited to an expired commodity, however, and may be a particular commodity other than an expired commodity.

As mentioned above, because an inventory employee can precisely count the object commodity to be inventoried with reference to the predetermined marks M1 with which images of the object commodities are labeled on the management display 53A or 53B. Further, the marked images are automatically counted so that the counting of the object commodity is precisely performed.

Since a particular commodity, such as an expired commodity, labeled with the predetermined special mark M2, it is possible for an inventory employee to discriminate the particular commodity from commodities other than the particular commodity, by referring to images of the particular commodity and the other commodities, which images are displayed on the management display 53A or 53B.

When the inventory computer 50A or 50B transmits the marked image, in which an image of a particular commodity is labeled with the predetermined special mark M2, to the clerk computer 10B disposed at the shop, an inventory employee that operates the inventory computer 50A or 50B issues minimum and proper instructions (e.g., removing an expired commodity) to a clerk at the shop, realizing a further effective inventory system with reduced costs.

If the mobile information terminal 50C is equipped with the pointing device 54, the marker 55, and the counter 56, the mobile information terminal 50C guarantees the same advantageous results as those of the inventory computer 50A and 50B.

(B) Others:

Further, the present invention should by no means be limited to this foregoing embodiment, and various changes or modifications may be suggested without departing from the gist of the invention.

In the first embodiment, the in-shop terminal 10 (the control computer 10A and the clerk computer 10B) is communicably connected to the remote management apparatus 50 (the inventory computers 50A and 50B, and the mobile information terminal 50C) via the LAN 40 and the telephone line 60. As an alternative, the in-shop terminal 10 and the remote management apparatus 50 may be communicably connected via a network, such as Internet, Intranet, or a dedicated communication line.

Still further, the mice 54A and 54B are used as the pointing device 54 in the first embodiment. However, the pointing device 54 should by no means be limited to a mouse. As an alternative, the pointing device 54 may be a track ball, a track pad, a tablet, a pen device (a stylus pen), or a joy stick.

What is claimed is:

1. A tele-inventory system for counting the number of commodities and/or checking the expiration dates of the commodities for inventorying various kinds of commodities in a shop by a human operator from a remote management apparatus that is installed remotely from the shop, comprising:

at the shop
camera means for taking images of object commodities to be inventoried;
image-transmitter means for transmitting said taken images of the object commodities to the remote management apparatus;

at the remote management apparatus
image-receiver means for receiving said taken images of the object commodities from said image-transmitter means;
display means for displaying said taken images of the object commodities which images have been received by said image-receiver means;

pointer means for pointing by the human operator the individual object commodity in said taken images of the object commodities which images have been displayed on said display means;

marker means for selectively labeling said taken image of the individual object commodity, which image has been pointed by said pointer means, with either one of a predetermined mark and a special mark other than the predetermined mark; and counter means for counting the number of images of the object commodities which have been labeled with the predetermined marks by said marker means, whereby the human operator is able to make an inventory of the object commodities at the remote management apparatus.

2. A tele-inventory system according to claim 1, further comprising:

at the remote management apparatus instruction-transmitter means for transmitting instructions of the human operator to the shop; and at the shop instruction-receiver means for receiving said instructions of the human operator from the remote management apparatus.

3. A tele-inventory system according to claim 2, further comprising: at the shop camera control means for controlling said camera means based on said instructions of the human operator, which have been received by said instruction-receiver means.

4. A tele-inventory system according to claim 3, further comprising: at the shop manipulator means for manipulating a posture and a position of the individual object commodity; and manipulator controlling means for controlling said manipulator means based on said instructions of the human operator, which have been received by said instruction-receiver means.

5. A tele-inventory system according to claim 3, further comprising:

at the shop a database for previously storing commodity information about a correlation between the individual object commodity and position information about a position of the individual object commodity; and said camera control means being operable, based on said instructions received by said instruction-receiver means, to read, from said database, commodity information with respect to the individual object commodity contained in said instructions, and to control said camera means in such a manner that said camera means takes an image of the last-named individual object commodity.

6. A tele-inventory system according to claim 2, further comprising:

at the shop in-shop display means for displaying a marked image, which is the image labeled with said either one of a predetermined mark and a special mark other than the predetermined mark by said marker means and which has been received together with instructions of the human operator by said instruction-receiver means of the shop from said instruction-transmitter means of the remote management apparatus, so that a sales clerk of the shop sees said marked image to make arrangements for various processes based on the last-named instructions of the human operator.

7. A tele-inventory system according to claim 1, wherein said camera means serves also as a security camera, which is usually previously installed in the shop.

8. A tele-inventory system according to claim 1, wherein the remote management apparatus is a mobile information processing terminal to be operated by the human operator.

9. A tele-inventory system according to claim 1, wherein the remote management apparatus is installed at a remote place in a different time zone from the time zone of a shop place where the shop is located.

10. A tele-inventory system according to claim 5, wherein:

said image-transmitter means and said instruction-receiving means are communicably connected to a plurality of customer information terminals to be operated by individual customers of the shop;

upon receipt of a direction containing the name of a target commodity from the individual customer information terminal, at the shop said camera control means reads, from said database, commodity information with respect to the individual object commodity corresponding to the target commodity contained in the direction of the individual customer based on the direction, and controls said camera means in such a manner that said camera means takes an image of the target commodity; and said image-transmitter means transmits the last-named taken image of the target commodity taken by said camera means to the last-named customer information terminal.

11. A tele-inventory system for counting the number of commodities and/or checking the expiration dates of the commodities for inventorying various kinds of commodities in a shop by a human operator from a remote management apparatus that is installed remotely from the shop, comprising:

at the shop a camera taking images of object commodities to be inventoried;

an image-transmitter transmitting said taken images of the object commodities to the remote management apparatus;

at the remote management apparatus an image-receiver receiving said taken images of the object commodities from said image-transmitter means;

a display displaying said taken images of the object commodities which images have been received by said image-receiver;

a pointer pointing by the human operator the individual object commodity in said taken images of the object commodities which images have been displayed on said display;

a marker for selectively labeling said taken image of the individual object commodity, which image has been pointed by said pointer, with either one of a predetermined mark and a special mark other than the predetermined mark; and a counter for counting the number of images of the object commodities which have been labeled with the predetermined marks by said marker, whereby the human operator is able to make an inventory of the object commodities at the remote management apparatus.

* * * * *